Aug. 13, 1935. E. P. LARSH 2,011,493
SELF ALIGNING BEARING
Filed Feb. 6, 1932
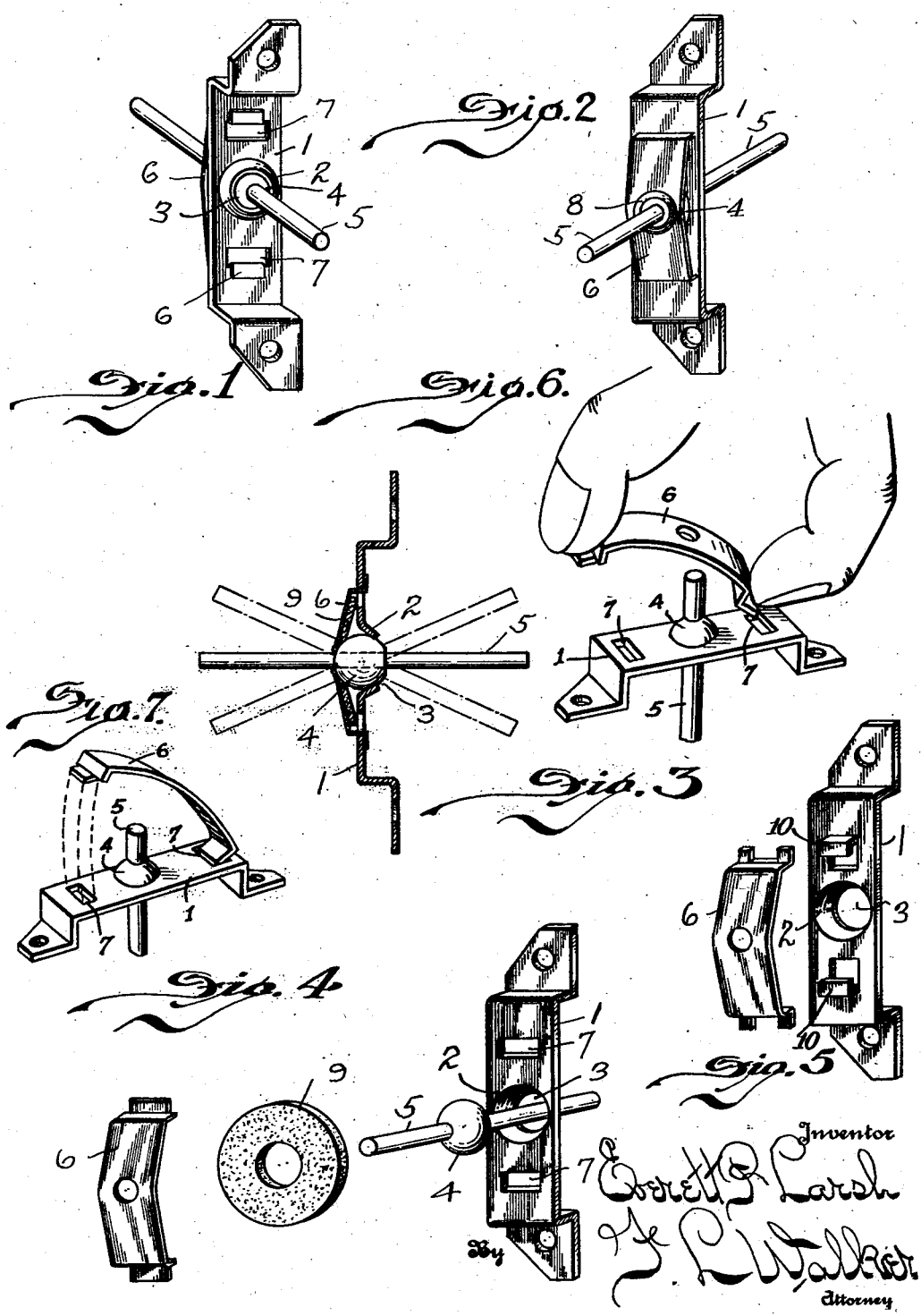

Patented Aug. 13, 1935

2,011,493

UNITED STATES PATENT OFFICE 2,011,493

SELF ALIGNING BEARING

Everett P. Larsh, Dayton, Ohio, assignor to The Master Electric Company, Dayton, Ohio, a corporation of Ohio Application February 6, 1932, Serial No. 591,402

9 Claims. (Cl. 308—72)

This invention relates to shaft bearings and particularly to universally adjustable bearings of the self aligning type.

The object of the invention is to provide a bearing suitable for small motors and light machinery which will be of comparatively cheap and economical construction, and which will be automatically adjustable, easily and quickly assembled, and unlikely to get out of repair.

While self aligning bearings wherein the bearing body is mounted for limited universal adjustment are quite well known, the present construction affords an improved mounting for such adjustable bearing member and means by which the adjustable bearing is maintained under yielding tension.

A further object of the invention is to provide improved lubrication means for the bearing.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawing wherein is shown the preferred but obvious not necessarily the only form of embodiment of the invention, Fig. 1 is a perspective view of a portion of a motor structure embodying the present invention. Fig. 2 is a similar view observed from the opposite side. Fig. 3 is a sectional view. Fig. 4 shows an exploded view of the modification disclosed in Figs. 1 and 2. Fig. 5 discloses a modification. Figs. 6 and 7 show views of the bearing in different stages of disassembly.

Like parts are indicated by similar characters of reference throughout the several views.

In the drawing 1 is a mounting piece which for illustrative purposes is a portion of a small induction motor, the bearing shown being the rotor shaft bearing. The bearing assembly mounted upon the stator of an induction motor is shown in my co-pending application Serial No. 591,705 filed February 8, 1932, now Patent No. 1,939,399 granted December 12, 1933. It is to be understood however that the invention is applicable to various purposes and that the shape of the mounting member is quite immaterial. The mounting piece is preferably though not necessarily formed from sheet material and is embossed to form therein a concavo-convex boss 2 forming a socket of spherical contour having at its center or apex a hole 3. Seated within the socket for universal rocking adjustment is a bearing body 4 preferably of porous material or of oilless antifriction composition, of which there are various forms now available. The bearing body 4 is of spherical form or in any event has at least one spherical face which is seated within the socket or concavity of the boss 2. In the drawing the bearing body 4 is shown of somewhat spheroidal form which is preferred. It is provided with an axial hole to receive the shaft 5 which extends through the hole 3 of the mounting piece and is journaled in the bearing body.

Extending across the bearing body 4 is a resilient bar or bow spring 6 the ends of which are engaged with the mounting piece 1 at opposite sides of the bearing body. Any suitable means may be employed for detachably securing the ends of the bow spring 6. A simple and inexpensive method consists in providing slots 7 in the mounting piece in which the ends of the bow spring are inserted, the spring ends being bent into offset formation for this purpose. The slots 7 are so spaced that the spring bar 6 must be flexed to effect the engagement of its ends in the slots whereupon the reaction of the spring will maintain such engagement. The tensioned spring bar 6 medially rests upon the bearing body 4, exerting yielding pressure thereon holding the bearing body within the socket and resisting undue movement or vibration but permitting necessary aligning adjustment of the bearing body. If desired the bow spring 6 may be formed with a slight depression 8 within which the outer face of the bearing body seats, although such seat is not essential.

A pad 9 of absorbent material may be interposed between the bow spring and the bearing body to serve as a lubricant reservoir, from which lubricant will be supplied as needed to the bearing. If the body 4 is formed of porous bearing material as preferred it will be kept saturated with lubricant from the pad 9. While the use of the pad is quite desirable and affords a convenient method of maintaining an adequate supply of lubricant it is not an essential feature and may be omitted.

As an alternative method of detachably engaging the ends of the bow spring with the mounting member, overhanging tongues 10 may be struck upward from such member, beneath which the ends of the bow spring, suitably notched for such purposes may be inserted, as is shown in Fig. 5.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A mounting having a socket therein, a bearing body seated in the socket for relative universal adjustment, a spring bar extending transversely of the bearing body and engaged with the mounting at opposite sides thereof, said spring bar exerting a transverse force upon the bearing and a longitudinal force upon the support, and an absorbent pad for lubricant interposed between the spring bar and the bearing body.

2. A self aligning motor bearing assembly including a mounting bar terminating in a pair of ears offset from the medial portion which has a concavity therein of substantially spheric segmental form, said mounting bar having retaining portions diametrically arranged with respect to said concavity, a bearing body having a spheric face seated in said concavity for universal adjustment relative thereto and having a bore receiving a rotating shaft journaled therein, and a removably mounted bow spring spanning said bearing exerting a transverse force thereon, the end of the bow spring being arranged to cooperate with said diametrically arranged portions to hold the bow spring in position, said portions being provided with clearances permitting a longitudinal displacement of the bow spring which causes the ends to disengage said portions to permit the disassembly of said self aligning bearing assembly.

3. A self aligning motor bearing assembly including a mounting bar terminating in a pair of ears offset with respect to the medial portion which has a concavity therein of substantially spheric segmental form, said mounting bar having retaining portions diametrically arranged with respect to said concavity, a bearing having a spheric face seated in said concavity for universal adjustment relative thereto, said bearing having a bore in which a rotating shaft is journaled, and a removably mounted leaf spring spanning said bearing and exerting a transverse force thereon to retain the same in said concavity, said spring having its ends arranged in hooked relation with respect to the retaining portions upon said mounting bar, said portions having clearances permitting the spring to have its ends displaced causing the same to be released from the retaining portions to permit disassembly of the bearing assembly.

4. A self-aligning motor bearing assembly including a mounting bar of uniform width terminating in a pair of ears in a plane offset with respect to the plane of the medial portion, said medial portion having a concavity of substantially spheric segmental form and a pair of rectangular recesses diametrically arranged with respect to said concavity in aligned relation with said ears, a bearing body having a spheric face seated in said concavity for universal adjustment relative thereto and having a bore to receive a rotating shaft journaled therein, and a removably mounted resilient bow spring having the ends thereof bent into offset relation to engage said rectangular recesses when extending across the bearing member, said bow spring being removable by exerting end thrust upon the ends thereof to cause ends to disengage the mounting bar, said bow spring exerting a force upon the bearing member in the direction of the axis of the bore to resiliently hold the bearing in position.

5. A mounting having a socket and openings arranged in spaced relation with respect to said socket, a bearing body seated in the socket for relative universal adjustment, a spring bar having ears smaller than the openings in the mounting said ears being passed therethrough and engaged with the mounting whereby the spring bar may be removed by flexing so as to permit the ears to escape through the opening without distortion thereof to disassemble the bearing, and an absorbent pad for lubricant interposed between the spring bar and the bearing body.

6. A self aligning motor bearing assembly including a mounting bar terminating in a pair of ears in a plane offset with respect to the plane of the medial portion, said medial portion having a concavity of substantially spherical segmental form and a pair of recesses arranged in spaced relation with respect to said concavity, a bearing body having a spheric face seated in said concavity for universal adjustment relative thereto and having a bore to receive a rotating shaft journaled therein and a removably mounted resilient bow spring having the ends thereof bent into offset relation to engage said recesses when extending across the bearing member, the offset ends of the bow springs being smaller than the recesses whereby the bow spring may be removed by exerting end thrust upon the ends thereof to cause these to disengage the mounting bar, said bow spring exerting a force upon the bearing member in the direction of the axis of the bore to resiliently hold the bearing in position.

7. A self aligning motor bearing assembly including a mounting bar terminating in ears in a plane offset with respect to the plane of the medial portion, said medial portion having a concavity of substantially spheric segmental form and a pair of recesses diametrically arranged with respect to said concavity in aligned relation with said ears, a bearing body having a spheric face seated in said concavity for universal adjustment relative thereto and having a bore to receive a rotating shaft journaled therein and a removably mounted resilient bow spring having the ends thereof bent into offset relation to engage said recesses when extending across the bearing member, the offset ends of the bow spring being smaller than the recesses whereby the spring may be removed by exerting end thrust thereon to cause the ends to disengage the mounting bar.

8. A self-aligning bearing assembly including a mounting member terminating in ears in a plane offset with respect to the plane of the medial portion, said medial portion having a concavity of substantially spheric segmental form, said mounting member having a pair of recesses oppositely disposed with respect to said concavity and in aligned relation with said ears, a bearing body having a spheric face seated in said concavity for universal adjustment relative thereto and having a bore to receive a rotating shaft journaled therein and a removably mounted resilient bow spring member extending across the bearing member, the ends of the bow spring, normally seated in the recesses, being smaller than the recesses whereby the spring may be removed by exerting end thrust thereon to cause the ends to disengage the mounting member.

9. A self-aligning motor bearing assembly including a mounting member terminating in ears in a plane offset with respect to the plane of the medial portion thereof, said medial portion having a concavity of substantially spheric segmental form, a bearing body having a spheric face seated in said concavity for universal adjustment relative thereto and having a bore to receive a rotating shaft journaled therein and a removably mounted bow spring member, one of said members being provided with ears bent into offset relation, the other of said members being provided with a seat for engagement with the offset ears when the bow spring member extends across the bearing member, said bow spring member being removable by exerting end thrust thereon to flex the same within its elastic limit to cause a relative movement between the ears and seats to remove the bearing.

EVERETT P. LARSH.